United States Patent
Greiner et al.

(10) Patent No.: US 10,740,810 B2
(45) Date of Patent: *Aug. 11, 2020

(54) TOP GAMER NOTIFICATIONS

(71) Applicant: American Express Travel Related Services Company, Inc., New York, NY (US)

(72) Inventors: Hans-Jurgen Greiner, Desert Hills, AZ (US); Mallikarj U. Hiremath, Scottsdale, AZ (US); Kevin H. Ringger, Surprise, AZ (US); Mukund Shankar Simha, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,507

(22) Filed: Jan. 18, 2019

(65) Prior Publication Data

US 2019/0164207 A1    May 30, 2019

Related U.S. Application Data

(63) Continuation of application No. 14/339,284, filed on Jul. 23, 2014, now Pat. No. 10,217,151.

(51) Int. Cl.
*G06Q 30/06* (2012.01)
*H04W 4/80* (2018.01)
*H04W 4/23* (2018.01)

(52) U.S. Cl.
CPC .......... *G06Q 30/0613* (2013.01); *H04W 4/23* (2018.02); *H04W 4/80* (2018.02)

(58) Field of Classification Search
CPC ....... G06Q 30/0613; H04W 4/23; H04W 4/80
(Continued)

(56) References Cited

U.S. PATENT DOCUMENTS 5,500,890 A    3/1996    Rogge et al.
5,991,750 A    11/1999   Watson
(Continued)

FOREIGN PATENT DOCUMENTS

WO    2014106207    7/2014
WO    2015102889    7/2015
WO    2015134947    9/2015

OTHER PUBLICATIONS

Anonymous, Swirl Delivers First End-to-End In-Store Mobile Marketing Platform for Major Retailers, Oct. 17, 2013, PR Newswire. (Year: 2013).*

(Continued)

*Primary Examiner* — Jason B Dunham
*Assistant Examiner* — Brittany E Bargeon
(74) *Attorney, Agent, or Firm* — Greenberg Traurig, LLP

(57) ABSTRACT

The system may transmit a signal originating from a BLUETOOTH low energy ("BLE") beacon at a merchant location. The signal may include a first identifier associated with the merchant location and a merchant device. A customer device may receive the signal within a predetermined distance of the BLE beacon. The system may receive a transmission sent by the customer device in response to the signal from the BLE beacon. The transmission may include a second identifier associated with the user. The system may identify the user associated with the customer device based on the second identifier. The user may be at the merchant location.

19 Claims, 4 Drawing Sheets

(58) Field of Classification Search
USPC .................................................. 705/26.41
See application file for complete search history.

(56) References Cited

U.S. PATENT DOCUMENTS

| | | | |
|---|---|---|---|
| 6,014,636 | A | 1/2000 | Reeder |
| 6,014,647 | A | 1/2000 | Nizzari et al. |
| 6,185,683 | B1 | 2/2001 | Ginter |
| 6,965,868 | B1 | 11/2005 | Bednarek |
| 7,010,267 | B2 | 3/2006 | Vanluijt et al. |
| 7,147,149 | B2 | 12/2006 | Giraldin et al. |
| 7,254,388 | B2 | 8/2007 | Nam et al. |
| 7,353,208 | B1 | 4/2008 | Stambaugh |
| 7,364,071 | B2 | 4/2008 | Esplin et al. |
| 7,702,540 | B1 | 4/2010 | Woolston |
| 7,739,157 | B2 | 6/2010 | Bonner et al. |
| 7,926,717 | B2 | 4/2011 | McIntosh |
| 7,962,361 | B2 | 6/2011 | Ramchandani et al. |
| 8,015,088 | B2 | 9/2011 | Phillips et al. |
| 8,032,414 | B2 | 10/2011 | Payne et al. |
| 8,096,468 | B2 | 1/2012 | Myers et al. |
| 8,205,794 | B2 | 6/2012 | Myers et al. |
| 8,271,322 | B2 | 9/2012 | Ariyibi |
| 8,285,588 | B2 | 10/2012 | Postrel |
| 8,295,835 | B2 | 10/2012 | Coppinger |
| 8,369,842 | B2 | 2/2013 | Proctor, Jr. et al. |
| 8,385,896 | B2 | 2/2013 | Proctor, Jr. et al. |
| 8,423,048 | B2 | 4/2013 | Morrison |
| 8,483,714 | B2 | 7/2013 | Agardh et al. |
| 8,489,112 | B2 | 7/2013 | Roeding et al. |
| 8,533,000 | B1 | 9/2013 | Pletz et al. |
| 8,534,551 | B2 | 9/2013 | Rothschild |
| 8,538,389 | B1 | 9/2013 | Evans et al. |
| 8,567,671 | B2 | 10/2013 | Myers |
| 8,571,937 | B2 | 10/2013 | Rose et al. |
| 8,589,245 | B2 | 11/2013 | Michaelis et al. |
| 8,600,804 | B2 | 12/2013 | Ramchandani et al. |
| 8,618,932 | B2 | 12/2013 | Maia et al. |
| 8,666,891 | B2 | 3/2014 | Roberts |
| 8,676,663 | B1 | 3/2014 | Robinson et al. |
| 8,688,460 | B1 | 4/2014 | Pletz et al. |
| 8,700,530 | B2 | 4/2014 | Smith |
| 8,738,435 | B2 | 5/2014 | Libman |
| 8,740,064 | B2 | 6/2014 | Griffin et al. |
| 8,744,939 | B2 | 6/2014 | Phillips et al. |
| 8,750,868 | B2 | 6/2014 | Laroia et al. |
| 8,774,753 | B2 | 7/2014 | Jabara et al. |
| 8,798,647 | B1 | 8/2014 | Haney |
| 8,818,268 | B2 | 8/2014 | Matoba et al. |
| 8,825,085 | B1 | 9/2014 | Boyle et al. |
| 8,825,538 | B2 | 9/2014 | Insolia et al. |
| 9,015,277 | B1 | 4/2015 | Slavin |
| 9,326,226 | B2 | 4/2016 | Bahram |
| 9,665,881 | B1 | 5/2017 | Ward |
| 9,833,714 | B2* | 12/2017 | Olson ............... G06Q 30/0202 |
| 10,217,151 | B1* | 2/2019 | Greiner ............. G06Q 30/0613 |
| 2002/0147639 | A1 | 10/2002 | Williams |
| 2003/0028481 | A1 | 2/2003 | Flitcroft |
| 2003/0220835 | A1 | 11/2003 | Barnes, Jr. |
| 2004/0098332 | A1 | 5/2004 | Dvir |
| 2005/0049765 | A1 | 3/2005 | Chetia |
| 2005/0159863 | A1 | 7/2005 | Howard |
| 2006/0047546 | A1 | 3/2006 | Taylor et al. |
| 2007/0061216 | A1 | 3/2007 | Jain et al. |
| 2007/0264974 | A1 | 11/2007 | Frank |
| 2008/0109317 | A1 | 5/2008 | Singh |
| 2008/0114646 | A1* | 5/2008 | Ash ..................... G06Q 30/02 |
| | | | 705/14.12 |
| 2008/0262901 | A1 | 10/2008 | Banga |
| 2008/0294621 | A1 | 11/2008 | Kanigsberg |
| 2009/0171853 | A1 | 7/2009 | Georgiou et al. |
| 2009/0254971 | A1 | 10/2009 | Herz |
| 2010/0082446 | A1 | 4/2010 | Hjelm et al. |
| 2010/0131347 | A1 | 5/2010 | Sartipi |
| 2010/0145730 | A1 | 6/2010 | Abreu |
| 2010/0146607 | A1 | 6/2010 | Piepenbrink |
| 2010/0180009 | A1 | 7/2010 | Callahan |
| 2010/0320266 | A1 | 12/2010 | White |
| 2011/0231272 | A1 | 9/2011 | Englund et al. |
| 2011/0258049 | A1 | 10/2011 | Ramer |
| 2012/0022944 | A1 | 1/2012 | Volpi |
| 2012/0066084 | A1 | 3/2012 | Sneyders |
| 2012/0233158 | A1 | 9/2012 | Braginsky |
| 2012/0265596 | A1 | 10/2012 | Mazed |
| 2012/0324242 | A1 | 12/2012 | Kirsch |
| 2013/0204697 | A1 | 8/2013 | Boal |
| 2013/0217332 | A1 | 8/2013 | Altman et al. |
| 2013/0251216 | A1 | 9/2013 | Smowton et al. |
| 2013/0297422 | A1* | 11/2013 | Hunter ............... G06Q 30/0261 |
| | | | 705/14.58 |
| 2013/0325891 | A1 | 12/2013 | Masood et al. |
| 2013/0326009 | A1 | 12/2013 | Morgan |
| 2014/0046794 | A1 | 2/2014 | Vallery |
| 2014/0058841 | A1 | 2/2014 | Getchius |
| 2014/0058875 | A1 | 2/2014 | Yanchenko |
| 2014/0095580 | A1 | 4/2014 | Sartini |
| 2014/0108108 | A1 | 4/2014 | Artman et al. |
| 2014/0188733 | A1 | 7/2014 | Granbery |
| 2014/0214429 | A1 | 7/2014 | Pantel |
| 2014/0344011 | A1 | 11/2014 | Dogin |
| 2015/0073980 | A1 | 3/2015 | Griffin et al. |
| 2015/0120558 | A1 | 4/2015 | Andrews |
| 2015/0140982 | A1 | 5/2015 | Postrel |
| 2015/0142438 | A1 | 5/2015 | Dai |
| 2015/0220924 | A1* | 8/2015 | Bakker ............... G06Q 20/4014 |
| | | | 705/14.27 |
| 2015/0230045 | A1 | 8/2015 | Johnson |
| 2015/0248702 | A1* | 9/2015 | Chatterton ......... G06Q 30/0261 |
| | | | 705/14.58 |
| 2015/0278824 | A1 | 10/2015 | Zabar |
| 2015/0302412 | A1 | 10/2015 | Bhanoo |
| 2015/0319579 | A1 | 11/2015 | Syrjarinne |
| 2015/0332240 | A1 | 11/2015 | Harwood |
| 2015/0339655 | A1 | 11/2015 | Neelikattil et al. |
| 2015/0363861 | A1* | 12/2015 | Capel ................. G06Q 30/0631 |
| | | | 705/26.7 |
| 2015/0379581 | A1 | 12/2015 | Bruno et al. |
| 2015/0379601 | A1 | 12/2015 | Ouimet |
| 2015/0379650 | A1 | 12/2015 | Theobald |
| 2015/0381664 | A1 | 12/2015 | Bruno et al. |
| 2016/0019526 | A1 | 1/2016 | Granbery |
| 2016/0019536 | A1 | 1/2016 | Ortiz |
| 2016/0063476 | A1 | 3/2016 | Baldie |
| 2016/0267480 | A1 | 9/2016 | Metral |
| 2017/0091765 | A1 | 3/2017 | Lloyd |

OTHER PUBLICATIONS

Notice of Allowance dated Aug. 16, 2019 in U.S. Appl. No. 15/237,141.
Non-Final Office Action dated Jun. 10, 2019 in U.S. Appl. No. 14/995,052.
Non-Final Office Action dated Jun. 17, 2019 in U.S. Appl. No. 15/338,654.
Advisory Action dated Jun. 27, 2019 in U.S. Appl. No. 15/237,141.
International Search Report and Written Opinion dated Oct. 23, 2015 in Application No. PCT/US2015/041940.
International Search Report and Written Opinion dated Dec. 30, 2015 in Application No. PCT/US2015/051693.
International Preliminary Report on Patentabiliy dated Feb. 25, 2016 in Application No. PCT/US2015/041940.
Office Action dated Mar. 11, 2016 in U.S. Appl. No. 14/469,230.
International Preliminary Report on Patentabiliy dated Mar. 28, 2016 in Application No. PCT/US2015/051693.
Apple, Inc. "Getting Started with iBeacon Version 1.0," Jul. 2, 2014, entire document.
Examination Report dated Feb. 26, 2016 in Australian Application No. 2015201925.
Office Action dated Jul. 7, 2016 in U.S. Appl. No. 14/284,817.
Office Action dated Apr. 25, 2016 in Canadian Application No. 2,888,085.

(56) References Cited

OTHER PUBLICATIONS

Office Action dated Aug. 12, 2016 in U.S. Appl. No. 14/454,452.
Examination Report dated Aug. 3, 2016 in Australian Application No. 2015201925.
Final Office Action dated Nov. 10, 2016 in U.S. Appl. No. 14/284,817.
Advisory Action dated Jan. 25, 2017 in U.S. Appl. No. 14/284,817.
U.S. Appl. No. 14/454,452, filed Aug. 7, 2014 and entitled System and Method for Providing a Micro Registry.
U.S. Appl. No. 15/154,106, filed May 13, 2016 and entitled Systems and Methods for Contextual Services Across Platforms Based on Selectively Shared Information.
Examination Report dated Nov. 22, 2016 in Australian Application No. 2015201925.
Examination Report dated Jan. 23, 2017 in Australian Application No. 2015201925.
Examination Report dated Feb. 24, 2017 in Australian Application No. 2015201925.
Final Office Action dated Mar. 16, 2017 in U.S. Appl. No. 14/454,452.
Office Action dated Mar. 24, 2017 in U.S. Appl. No. 14/318,091.
Office Action dated Apr. 14, 2017 in U.S. Appl. No. 14/469,230.
Advisory Action dated Jul. 13, 2017 in U.S. Appl. No. 14/454,452.
Pocket-lint, Apple's iBeacons explained: What it is and why it matters, retrieved from internet on Feb. 21, 2017, http://web.archive.org/web/20130925141212/http://www.pocket-lint.com/news/123730-apple-sibeacons-explained-what-it-is-and-why-it-matters> published on Sep. 25, 2013 as per WaybackMachine, 10 pages.
Extended European Search Report dated Jun. 16, 2017 in European Application No. 15851256.6.
Office Action dated Aug. 16, 2017 in U.S. Appl. No. 14/515,813.
Final Office Action dated Sep. 13, 2017 in U.S. Appl. No. 14/318,091.
Final Office Action dated Oct. 2, 2017 in U.S. Appl. No. 14/469,230.
Office Action dated Oct. 2, 2017 in U.S. Appl. No. 14/454,452.
Advisory Action dated Nov. 7, 2017 in U.S. Appl. No. 14/318,091.
Office Action dated Nov. 14, 2017 in U.S. Appl. No. 14/284,817.
Advisory Action dated Nov. 17, 2017 in U.S. Appl. No. 14/469,230.
Final Office Action dated Jan. 24, 2018 in U.S. Appl. No. 14/515,813.
Non-Final Office Action dated Feb. 9, 2018 in U.S. Appl. No. 14/318,091.
USPTO, Advisory Action dated Mar. 27, 2018 in U.S. Appl. No. 14/515,813.
USPTO, Final Office Action dated Apr. 20, 2018 in U.S. Appl. No. 14/454,452.
Advisory Action dated Jun. 12, 2018 in U.S. Appl. No. 14/454,452.
Final Office Action dated Jun. 14, 2018 in U.S. Appl. No. 14/318,091.
Notice of Allowance dated Jun. 27, 2018 in U.S. Appl. No. 14/469,230.
Final Office Action dated Jul. 6, 2018 in U.S. Appl. No. 14/284,817.
Advisory Action dated Jul. 30, 2018 in U.S. Appl. No. 14/318,091.
U.S. Appl. No. 16/109,046, filed Aug. 22, 2018 and titled "Transactions Using a Bluetooth Low Energy Beacon".
Non-Final Office Action dated Nov. 17, 2016 in U.S. Appl. No. 14/339,284.
Final Office Action dated Mar. 28, 2017 in U.S. Appl. No. 14/339,284.
Advisory Action dated Jun. 12, 2017 in U.S. Appl. No. 14/339,284.
Non-Final Office Action dated Jul. 14, 2017 in U.S. Appl. No. 14/339,284.
Final Office Action dated Dec. 29, 2017 in U.S. Appl. No. 14/339,284.
Advisory Action dated Feb. 15, 2018 in U.S. Appl. No. 14/339,284.
Non-Final Office Action dated May 23, 2018 in U.S. Appl. No. 14/339,284.
Final Office Action dated Sep. 11, 2018 in U.S. Appl. No. 14/339,284.
Final Office Action dated Apr. 12, 2019 in U.S. Appl. No. 15/237,141.
Final Office Action dated May 17, 2019 in U.S. Appl. No. 15/154,106.
Notice of Allowance dated Dec. 26, 2018 in U.S. Appl. No. 14/339,284.
Non Final Office Action dated Oct. 3, 2019 in U.S. Appl. No. 15/442,945.
Advisory Action dated Jul. 29, 2019 in U.S. Appl. No. 15/154,106.
Final Office Action dated Sep. 6, 2019 in U.S. Appl. No. 14/454,452.

\* cited by examiner

TOP GAMER NOTIFICATIONS

CROSS REFERENCE TO RELATED APPLICATIONS

This application is a continuation of, claims priority to and the benefit of, U.S. Ser. No. 14/339,284 filed Jul. 23, 2014 and entitled "SYSTEMS AND METHODS FOR PROXIMITY BASED COMMUNICATION," which is incorporated by reference herein in its entirety.

FIELD

The present disclosure generally relates to e-commerce, and more particularly, to initiating communication based upon the proximity of a customer to a merchant location.

BACKGROUND

At present, customers may communicate with merchants over the Internet, but customers may not be able to notify merchants when the customers are present at merchant locations. Location services such as GPS may be used to roughly find a customer location. However, GPS location services are frequently inaccurate and dependent on signal availability.

SUMMARY

A system, method, and computer readable medium (collectively, the "System") for initiating communication based on the proximity of a customer to a merchant location are provided. The system may be configured to perform operations and/or steps comprising transmitting (by a computer based system for facilitating communication between a user and a merchant) a signal originating from a BLUETOOTH low energy ("BLE") beacon at a merchant location, wherein the signal comprises a first identifier associated with the merchant location and a merchant device, and wherein a customer device receives the signal within a predetermined distance of the BLE beacon. The system also comprises receiving, by the computer based system, a transmission sent by the customer device in response to the signal from the BLE beacon, the transmission comprising a second identifier associated with the user. The system further comprises identifying, by the computer based system, the user associated with the customer device based on the second identifier, wherein the user is at the merchant location.

In various embodiments, the first identifier may include a universally unique identifier, a major number, and a minor number associated with the merchant location. The second identifier may include an image of the user.

In various embodiments, the system may identify the user as a user of interest for the merchant location based on a transaction history of the user at the merchant location. The user may be identified as the user of interest, in response to the transaction history comprising a spend at the merchant location greater than a predetermined spend over a predetermined time period. The user may be identified as the user of interest, in response to the transaction history comprising a frequency of visits to the merchant location greater than a predetermined frequency over a predetermined time period.

Various embodiments of the system may comprise transmitting, by the computer based system, content to the customer device via a BLE connection.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, a "micro location" of a customer may comprise a location of a customer in relation to one or more transmission devices. For example, the transmission device may be a BLUETOOTH enabled device (e.g., a wireless beacon) communicating using a low power or low energy BLUETOOTH communication standard (a "BLUETOOTH LOW ENERGY beacon" or simply, a "BLE beacon").

In various embodiments, any type of transmission device may be implemented with the systems described herein. For example, any device (including any other BLE beacon) capable of communicating with a customer device. Any transmission device within approximately 30 meters of a BLE beacon may comprise a transmission device. Thus, although the phrase "BLE beacon" is used herein with particular respect to a BLUETOOTH low-energy-consuming device, a BLE beacon 102 may comprise any transmission device capable of communication with a customer device.

In various embodiments, the transmission device may be capable of communication with a customer device or merchant device within a micro location of the device (e.g., to within approximately 30 meters or less). As described above, a transmission device (e.g., BLE beacon 102) may comprise any device capable of transmitting and/or receiving a signal wirelessly using a low power or low energy connection to a network. In various embodiments, such a signal may comprise a BLUETOOTH signal. A BLUETOOTH signal may comprise and/or utilize one or more communication protocols over a wireless network between one or more BLUETOOTH enabled devices.

Figure 1:
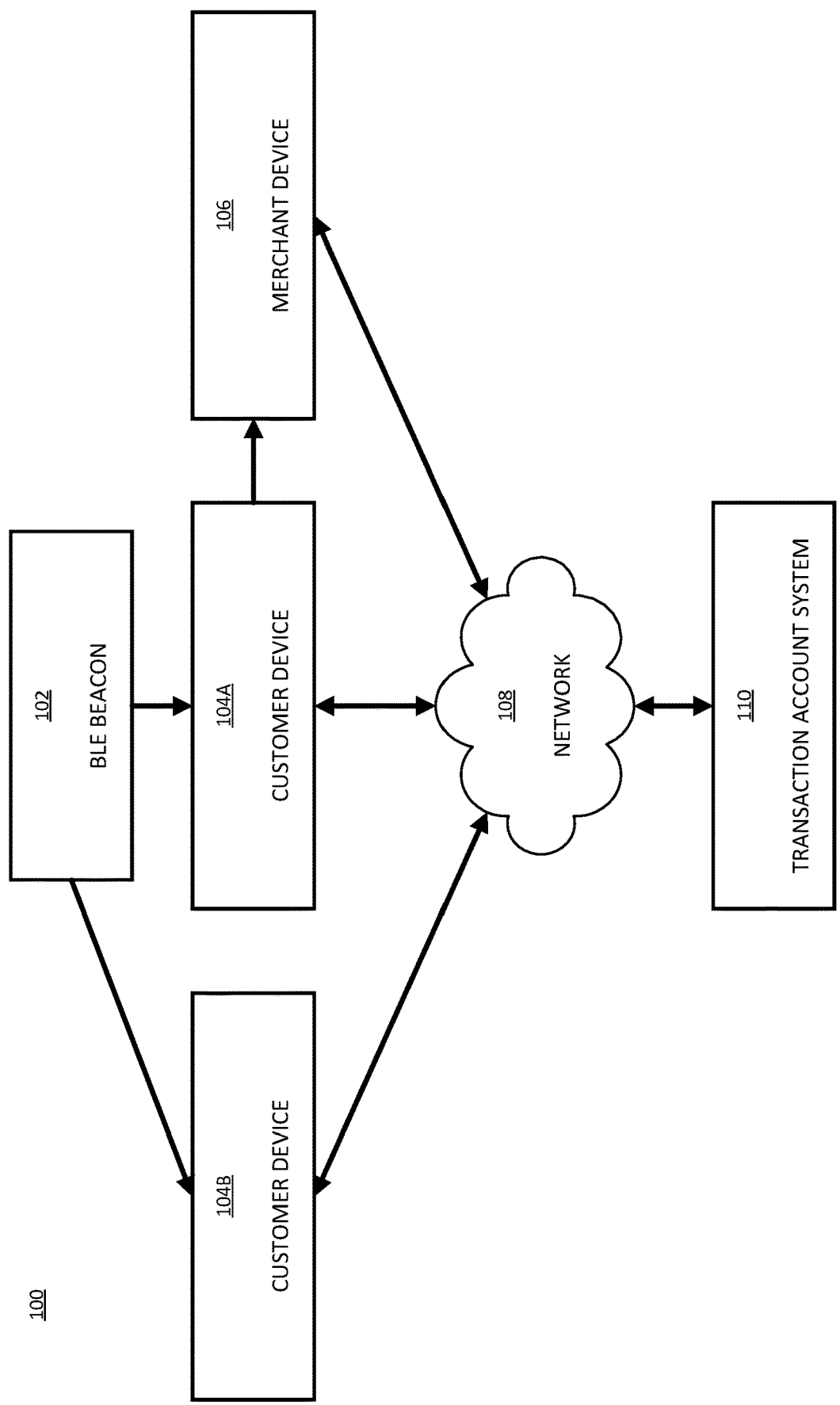
FIG. 1 illustrates a system for initiating communication between a customer and a merchant based upon a proximity of the customer to a merchant location, in accordance with various embodiments.

Although the term "BLE beacon" is used herein in association with a BLUETOOTH communication protocol and/or signal, the phrase may refer to any communication protocol and/or any other "low energy" signal. As used herein, a "low energy signal" may comprise any signal capable of being received by a customer or merchant device (e.g., within a range of approximately 30 meters or less). In various embodiments, and with reference to FIG. 1, a transmission device (e.g., a BLE beacon) 102 may enable the discovery of a micro location of a customer. A micro location may comprise any location of the customer within a predetermined distance of BLE beacon 102. For example, a micro location may comprise any location within 30 meters of BLE beacon 102.

In various embodiments, system 100 may be any suitable system capable of and/or configured to initiate customer communication with a merchant based upon a micro location of the customer. System 100 may comprise a transmission device or BLE beacon 102, one or more customer devices 104 (shown as customer device 104A and customer device 104B in FIG. 1), a merchant device 106, a network 108, and/or a transaction account system 110.

A merchant device 106 and/or a customer device 104 may be any device (e.g., personal computing device/mobile communication device) which communicates via any network 108 or via a wireless BLUETOOTH protocol. A web client may be associated with and/or used by a customer device, a merchant device, or both. In this regard, a web client may comprise a variety of browsing software or browser applications (e.g., Microsoft Internet Explorer, Mozilla Firefox, Google Chrome, Apple Safari, a dedicated micro-application, or any other suitable software packages available for communicating over a network 108). Such browser applications may comprise network 108 capable software installed within a computing unit or a system to conduct online transactions and/or communications. These computing units or systems may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Droid®, etc.) tablets such as iPads, wearable computing devices such as smart watches or smart glasses, or any suitable device capable of receiving data over network 108 or over a BLUETOOTH connection.

As those skilled in the art will appreciate, a customer or merchant device may include an operating system (e.g., Windows NT, 95/98/2000/CE/Mobile, OS2, UNIX, Linux, Solaris, MacOS, PalmOS, etc.) as well as various conventional support software and drivers typically associated with computers. A customer or merchant device may implement security protocols such as Secure Sockets Layer (SSL) and Transport Layer Security (TLS). A customer or merchant device may implement one or more application layer protocols, including, for example, http, https, ftp, and sftp. Transactions originating at a customer or merchant device may pass through a firewall (not shown; see below) in order to prevent unauthorized access from users of other networks.

A network 108 may comprise any electronic communications system or method which incorporates software and/or hardware components. Communication may be accomplished through any suitable communication channels, such as, for example, a telephone network, an extranet, an intranet, Internet, point of interaction device (point of sale device, personal digital assistant, smart phone, cellular phone (e.g., iPhone®, Palm Pilot®, Blackberry®), kiosk, etc.), online communications, satellite communications, offline communications, wireless communications, transponder communications, local area network (LAN), wide area network (WAN), virtual private network (VPN), networked or linked devices, keyboard, mouse and/or any suitable communication or data input modality. Moreover, although a network 108 may be described herein as being implemented with TCP/IP communications protocols, the network 108 may also be implemented using IPX, Appletalk, IP-6, NetBIOS, OSI, any tunneling protocol (e.g. IPsec, SSH), or any number of existing or future protocols. If the network 108 is in the nature of a public network, such as the Internet, it may be advantageous to presume the network 108 to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components described herein may be independently, separately or collectively coupled to the network 108 via one or more data links including, for example, a connection to an Internet Service Provider (ISP) over a local loop as is typically used in connection with standard modem communication, cable modem, Dish networks, ISDN, or Digital Subscriber Line (DSL). It is noted that the network 108 may be implemented variously. The systems and methods disclosed herein contemplate the use, sale and/or distribution of any goods, services or information over any network having functionality similar to that described above with reference to network 108.

Figure 2:
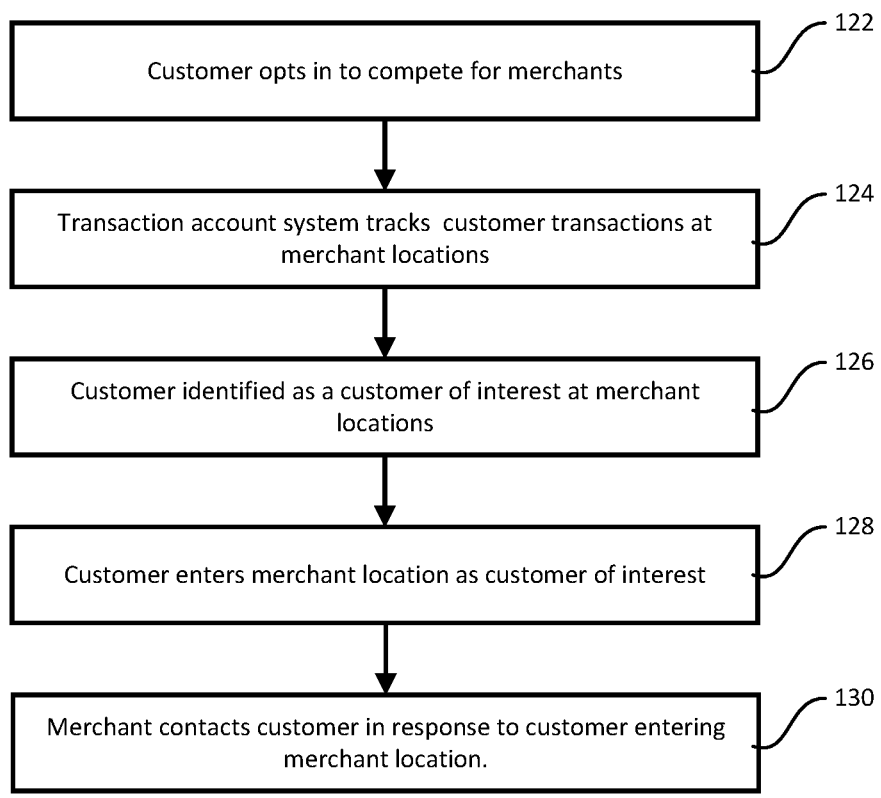
FIG. 2 illustrates a method for identifying a customer as a customer of interest to a merchant based on the customer's transaction history with the merchant, in accordance with various embodiments.

In various embodiments, and with reference to FIG. 2, system 100 may be capable of performing operations and/or steps of method 120 for identifying a customer as a customer of interest to a merchant based on customer transactions with the merchant. A customer may opt in to obtain (or compete for) customer of interest status with merchants based on the customer transactions at the merchants (Step 122). The customer may then be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors.

Transaction account system 110 may track customer transactions at merchant locations by counting the number of transactions completed at locations (e.g., predetermined locations) and the amount spent at the locations (Step 124). For example, transaction account system 110 may be a merchant or payment processor that has access to such information. Transaction account system 110 may also receive similar data, or any portion of the data, from a merchant, payment processor or other sources.

The customer may be identified as a customer of interest at a merchant based on the customer's transaction history at the merchant (Step 126). In various embodiments, a customer may be identified as a customer of interest by completing a large number of transactions at a particular merchant, by spending a large amount at a particular merchant, or by visiting a particular merchant more than other customers. For example, a Customer A may complete 10 transactions at Merchant A in a month. Customer B may complete 11 transactions at Merchant A in the same month. Customer B may be identified as a customer of interest to Merchant A where the customer of interest parameters include the total number of transactions completed over a period of time or an amount of total spend. The customer of interest for Merchant A may be the customer with the highest total amount of spend at Merchant A over a determined period of time (e.g., a day, a week, a month, a season, and/or any other suitable time period).

In various embodiments, the customer may enter the range of a BLE beacon at a merchant location. The customer may have previously been identified as a customer of interest by transaction account system 110 (Step 128). For example, a computer based system may identify the customer as a customer of interest based on a transaction history at the merchant location or any other factors. The computer based system may initiate contact between the merchant and customer, in response to a customer device receiving the signal from BLE beacon 102 (Step 130). For example, a BLE beacon 102 may broadcast a signal at the merchant location indicating to customer device 104A within range of the BLE beacon 102 that the customer associated with customer device 104A is entering the merchant location. Customer device 104A may then respond to the signal by transmitting a customer identifier to acknowledge the customer presence in the merchant location. In various embodiments, the response from the customer device 104A may be automatic, in response to an approval from the customer, periodic, based on certain rules or factors and/or the like. For example, the customer device 104A may be programmed to only send a response to certain merchants and/or on certain days.

Figure 3:
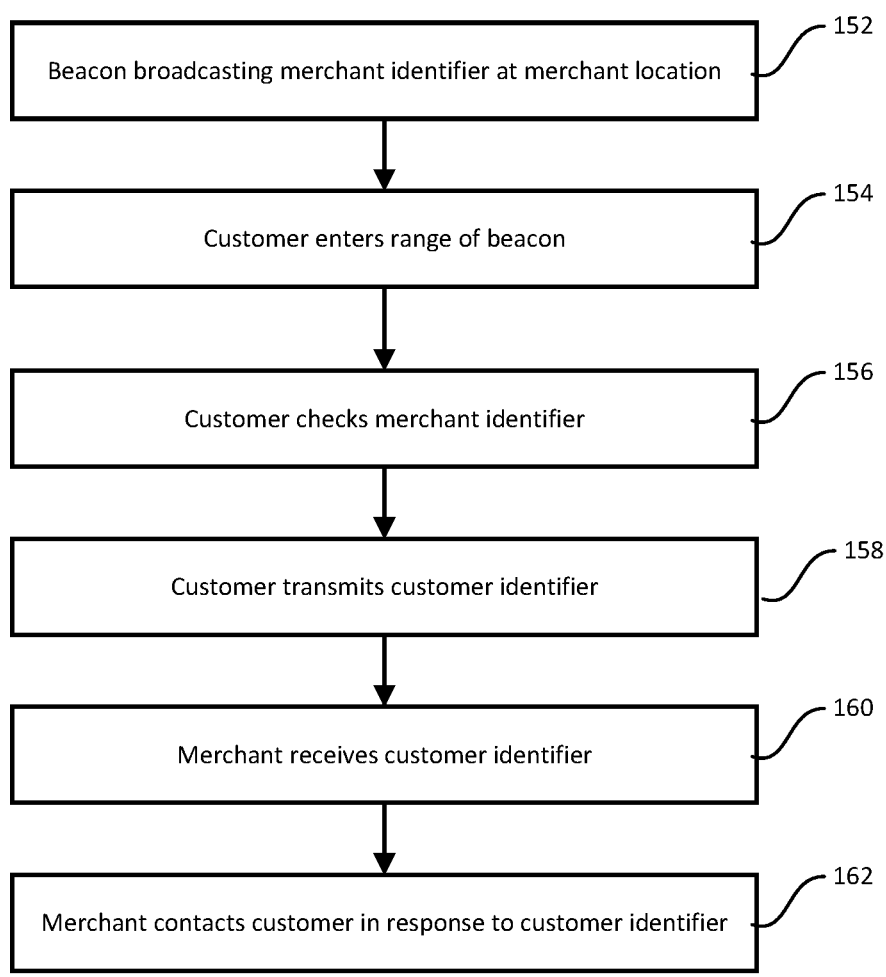
FIG. 3 illustrates a method for initiating communication between a customer of interest and a merchant based on proximity of the customer to a merchant location, in accordance with various embodiments.

In various embodiments, and with reference to FIG. 3, system 100 may be capable of performing operations and/or steps of method 150 for initiating direct communication between a customer and a merchant. A transmission device or BLE beacon 102 may be placed at a merchant (Step 152). BLE beacon 102 may broadcast a merchant identifier at a predetermined interval. The merchant identifier broadcast by BLE beacon 102 may identify a particular merchant to customer device 104 to notify the customer device 104 when a customer associated with customer device 104 has entered a merchant location.

In various embodiments, the customer may enter the range of BLE beacon 102 broadcasting merchant identifier (Step 154). For example, BLE beacon 102 may broadcast a universally unique identifier (UUID), major number, and minor number to identify the merchant. The merchant identifier may identify a particular merchant for which the customer is a customer of interest. Customer device 104A may detect the merchant identifier broadcast by BLE beacon 102 in response to customer device 104A being within range of BLE beacon 102. Customer device 104 may check the merchant identifier in response to the broadcast from BLE beacon 102 against a list of known merchant identifiers for merchant locations where the customer is a customer of interest (Step 156). Customer device 104A may transmit a customer identifier to notify merchant device 106 that the customer has entered the merchant location (Step 158). The customer identifier may include, for example, a photo, a name, demographic information, spend level information, spending frequency, social media information, interests, and/or other information particular to the customer. The customer identifier may also include an identification number such as a UUID, major number, and minor number. Merchant device 106 may receive the customer identifier transmitted by customer device 104A (Step 160). Merchant device 106 may check the customer identifier against a list of customers of interest. The merchant may respond to the customer identifier sent from customer device 104A (Step 162). For example, the merchant may personally greet the customer at the merchant location, or merchant device 106 may transmit an item to customer device 104A. The merchant device 106 may automatically notify certain sales people about the customer's location. The merchant device 106 may also adjust offers or items in the store to be of more interest to certain consumers. For example, a sign next to certain products known to be of interest to a consumer may be adjusted to provide a larger discount while the customer is in the store.

Figure 4:
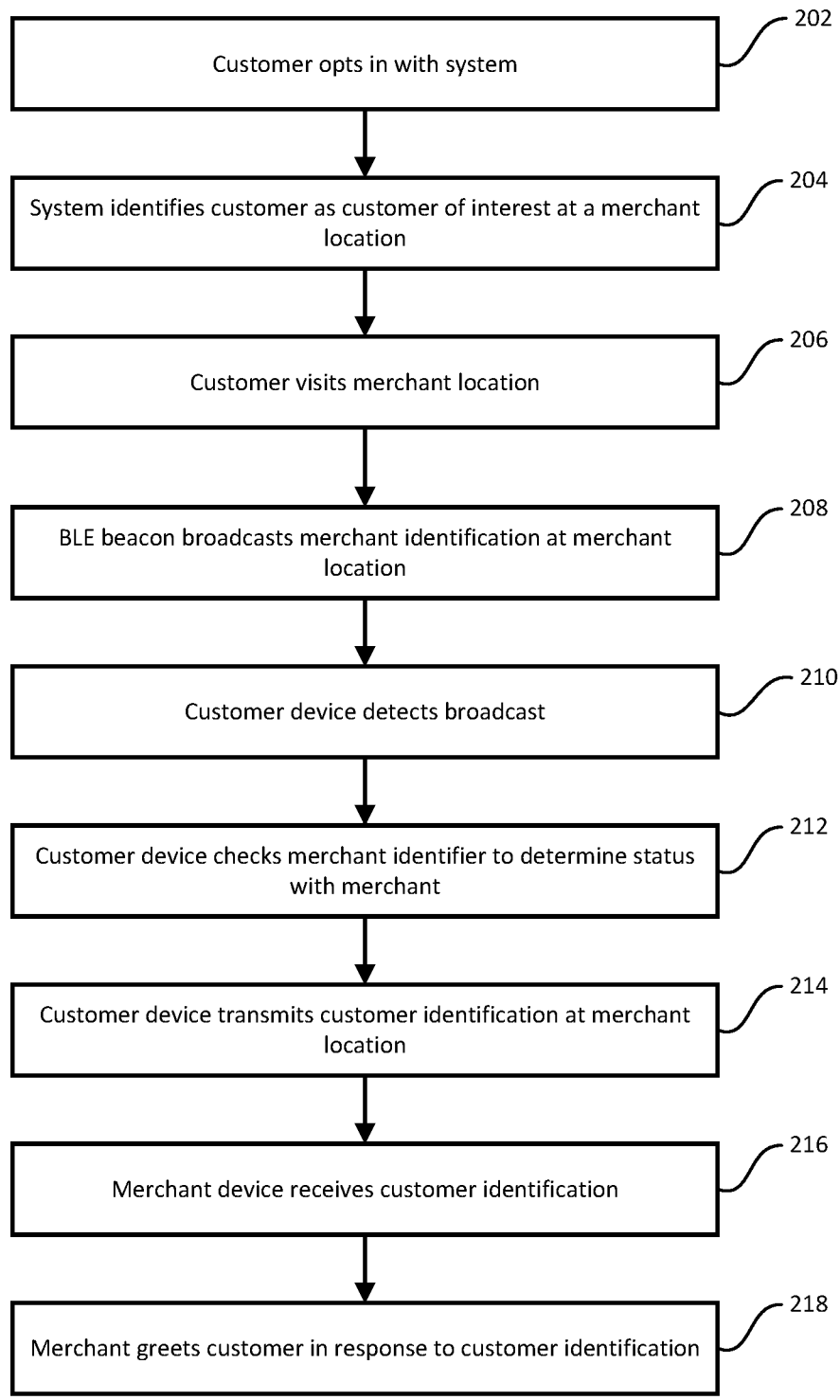
FIG. 4 illustrates a method for initiating communication between a customer of interest and a merchant based on proximity of the customer to a merchant location, in accordance with various embodiments.

In various embodiments, and with reference to FIG. 4, system 100 may be capable of performing operations and/or steps of method 200 for notifying a merchant in response to a customer of interest entering a merchant location. A customer may opt in to the communication program (Step 202). Customer devices 104 and merchant device 106 may be connected to network 108 to communicate with other devices such as transaction account system 110, for example. The customer may register with transaction account system 110 to provide and/or be assigned an identifier such as a UUID, major number, and minor number. Transaction account system 110 may store and/or assign UUID, major number, and minor numbers for customer devices 104 and merchant devices 106. A customer may have an associated transaction account number to identify the customer. A UUID, major number, and minor number may be associated with the customer in a database using the transaction account number as a key, for example. Similarly, a UUID, major number, and minor number may be associated with a merchant in a database using a merchant account number as a key. Transaction account system 110 may identify customers as customers of interest at certain merchant locations and may provide merchant device 106 with a list of identifiers for top customers to match against a UUID, major number, and/or minor number broadcast from a customer device 104. Transaction account system 110 may also identify customers as customers of interest at certain merchant locations and provide customer devices 104 with a list of identifiers for merchants to match against a UUID, major number, and minor number broadcast from BLE beacon 102.

In various embodiments, the customer may be identified as a customer of interest for specific merchants (Step 204). For example, a customer may be identified as a top gamer for Merchant A by their score on a mobile gaming application. The customer may also be identified as a customer of interest of Merchant A based on the amount spent at Merchant A stores or a frequency of purchases at Merchant A stores. The customer may also be identified by social media or any other online information.

In various embodiments, the customer may visit the merchant location with a customer device to detect a BLE transmission from a computer based system. For example, a customer nears a store location of Merchant A containing BLE beacon 102 (Step 206). BLE beacon 102 may be configured in a peripheral (i.e., broadcasting) role (Step 208). In this regard, BLE beacon 102 may broadcast a merchant identifier at the merchant location at regular intervals. The merchant may have placed transmission device or BLE beacon 102 at a merchant location to signal customers entering the broadcast range of BLE beacon 102. BLE beacon 102 may be configured as a peripheral to broadcast identifying information including a UUID, major number, and minor number assigned to BLE beacon 102. The UUID may be an identifier used to distinguish BLE beacon 102 from other BLE devices. For example, Merchant A may have BLE beacons located at each Merchant A location and Merchant B has BLE beacons in each Merchant B location. All of the BLE beacons at Merchant A locations may have a first UUID, and all the BLE Beacons at Merchant B locations may have a second UUID distinct from the first UUID. Thus, a BLE device such as a customer device may scan for beacons with the first UUID to identify locations of Merchant A.

In various embodiments, BLE beacons 102 may also transmit a major number and minor number along with the UUID. The major number may be used to group a set of related beacons. For example, all beacons in a single Merchant A location may have the same major number. The minor number may be used to identify individual beacon. Thus, each beacon in the same Merchant A location may have a different minor number even though the major number for each beacon is different. BLE beacon 102 may also broadcast content such as connection information for a customer device to interact with a merchant device.

Customer device 104 may be configured in a central (i.e., receiving) role to receive transmissions from BLE beacons, in accordance with various embodiments. Customer devices 104A and 104B may receive the broadcast from BLE beacon 102 including the UUID, major number, and minor number as well as any content that may be provided by BLE beacon 102 (Step 210). The broadcast may an identifier for the merchant and merchant location to customer device 104A. Customer devices 104A and 104B check whether the UUID, major number, and minor number correspond to a merchant for which customer is a customer of interest (Step 212). Customer device 104B is not a customer of interest for the merchant identifier broadcast by BLE beacon 102, so customer device 104B may not respond to receiving the broadcast. The customer associated with customer device 104A may be a customer of interest at the merchant location. Customer device 104A may switch from the central (i.e., receiving) role to a peripheral (i.e., broadcasting) role in response to receiving the merchant identifier from BLE beacon 102 (Step 214). Customer device 104A may transmit customer identifier that may include a UUID, major number, and minor number as well as content such as an image, name, or other customer information.

Merchant device 106 may be configured in a central (i.e., receiving) role and receives the transmission from customer device 104A, in accordance with various embodiments (Step 216). Merchant device 106 may identify the customer as a customer of interest by comparing the UUID, major number, and minor number transmitted by customer device to list of known customers of interest. Merchant device 106 may also receive, in the transmission from customer device 104A, an image depicting the customer associated with customer device 104A. Merchant device 106 may display a message that a customer of interest is within the broadcast range of (i.e., inside the same merchant location as) BLE beacon 102. Merchant device 106 may also display the image transmitted by customer device 104A. The merchant may then greet, in person or using a transmission from merchant device 106, the customer identified as a customer of interest. The merchant may offer, in person or using a transmission from merchant device 106, an item such as, for example, one-time discount or other reward to the customer of interest.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases or terms similar to a "processor" (such as a payment processor) or "transaction account issuer" may include a company (e.g., a third party) appointed (e.g., by a merchant) to handle transactions for merchant banks. Processors may be broken down into two types: front-end and back-end. Front-end processors have connections to various transaction accounts and supply authorization and settlement services to the merchant banks' merchants. Back-end processors accept settlements from front-end processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

As used herein, "transmit" may include sending electronic data from one system component to another over a network connection. Additionally, as used herein, "data" may include encompassing information such as commands, queries, files, data for storage, and the like in digital or any other form. Furthermore, as used herein, "broadcast" may include sending electronic data from one system component to onto a network for another system component to detect.

Phrases or terms similar to "transaction account" may include any account that may be used to facilitate a financial transaction. A "transaction account" as used herein refers to an account associated with an open account or a closed account system (as described herein). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

In various embodiments, a transaction account may be may include any account that may be used to facilitate a financial transaction including, for example, a charge account, a credit account, a bank account (e.g., a checking or savings account), and/or the like. The transaction account may include a transaction instrument such as a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

In various embodiments, an account number may identify a customer. In addition, in various embodiments, a customer may be identified by a variety of identifiers, including, for example, an email address, a telephone number, a cookie id, a radio frequency identifier ("RFID"), a biometric, and the like.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "transaction" may include any purchase, exchange, lease, rental, deal, agreement, authorization, settlement, information exchange, item exchange, a record of charge (or "ROC"), record of transaction ("ROT"), including all related data and metadata, and/or the like. Moreover, the transaction, information associated with the transaction, and/or a record associated with the transaction may comprise a unique identifier associated with a transaction. A transaction may, in various embodiments, be performed by one or more account holders using a transaction account. The transaction account may be associated with a transaction instrument such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles. The present system or any part(s) or function (s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows operating system, UNIX®, Linux®, Solaris®, MacOS, etc.) as well as various conventional support software and drivers typically associated with computers.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, components, modules, and/or engines of systems may be implemented as micro-applications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

Phrases and terms similar to an "item" may include any good, service, offer, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available, e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method, comprising:
    acquiring, by a computer based system, a score from a mobile gaming app of a customer device associated with a customer;
    determining, by the computer based system and based on the score, that the customer is a top gamer associated with a merchant at a merchant location;
    identifying, by the computer based system, the customer with a top gamer identifier;
    transmitting, by the computer based system, the top gamer identifier to the mobile gaming app on the customer device;
    determining, by the computer based system, that the customer is on a list of customers of interest associated with the merchant at the merchant location;
    determining, by the computer based system, a direct communication between a merchant device of the merchant and the customer device should be established, based on the customer being on the list of the customers of interest and the top gamer identifier; and
    notifying, by the computer based system, the merchant device to establish the direct communication between the merchant device and the customer device,
    wherein a discount is provided for display on the customer device while the customer device is in the merchant location, and
    wherein the discount is only valid while the customer device continues to be within range of a BLE beacon at the merchant location.

2. The method of claim 1, further comprising receiving, by the computer based system and from the customer device, a registration to receive the discount.

3. The method of claim 1, wherein the merchant device notifies a manager to personally greet the customer.

4. The method of claim 1, further comprising providing, by the computer based system and to the customer device, a customer identifier associated with a customer transaction account number of the customer.

5. The method of claim 1, further comprising providing, by the computer based system and to the merchant device, a merchant identifier associated with a merchant account number of the merchant.

6. The method of claim 1, further comprising determining, by the computer based system, the list of customers of interest associated with the merchant at the merchant location.

7. The method of claim 1, further comprising determining, by the computer based system, a list of merchant identifiers for which the customer is one of the customers of interest.

8. The method of claim 1, further comprising providing, by the computer based system, a merchant account number and a list of merchant identifiers to the customer device.

9. The method of claim 1, wherein a merchant identifier identifies the merchant for which the customer is one of the customers of interest.

10. The method of claim 1, wherein the mobile gaming app on the customer device provides the top gamer identifier and the customers of interest to the merchant device associated with the merchant location.

11. The method of claim 1, further comprising receiving, by the computer based system and from the customer device, a customer identifier and data related to the customer, in response to the customer device receiving a BLUETOOTH low energy ("BLE") identifier of the merchant location including a merchant identifier.

12. The method of claim 11, wherein the BLE identifier comprises a universally unique identifier, a major number, and a minor number associated with the merchant location.

13. The method of claim 1, wherein the customer device compares a merchant identifier against a list of merchant identifiers for which the customer is one of the customers of interest.

14. The method of claim 1, wherein data related to the list of the customers of interest comprises an image of the customer, a name of the customer demographic information about the customer, spend level information of the customer, spending frequency of the customer, social media information about the customer and interests of the customer.

15. The method of claim 1, wherein the customer is identified as one of the customers of interest in response to a customer transaction history comprising a spend at the merchant location greater than a predetermined spend over a predetermined time period.

16. The method of claim 1, wherein the customer is identified as one of the customers of interest in response to a customer transaction history comprising a frequency of visits to the merchant location greater than a predetermined frequency over a predetermined time period.

17. The method of claim 1, further including transmitting, by the computer based system, content to the customer device via a BLE beacon.

18. A computer based system, comprising:
a processor; and
a non-transitory memory configured to communicate with the processor, the non-transitory memory having instructions stored thereon that when executed by the processor cause the processor to perform operations comprising:
acquiring, by the processor, a score from a mobile gaming app of a customer device associated with a customer;
determining, by the processor and based on the score, that the customer is a top gamer associated with a merchant at a merchant location;
identifying, by the processor, the customer with a top gamer identifier;
transmitting, by the processor, the top gamer identifier to the mobile gaming app on the customer device;
determining, by the processor, that the customer is on a list of customers of interest associated with the merchant at the merchant location;
determining, by the processor, a direct communication between a merchant device of the merchant and the customer device should be established, based on the customer being on the list of the customers of interest and the top gamer identifier; and
notifying, by the processor, the merchant device to establish the direct communication between the merchant device and the customer device,
wherein a discount is provided for display on the customer device while the customer device is in the merchant location, and
wherein the discount is only valid while the customer device continues to be within range of a BLE beacon at the merchant location.

19. A non-transitory computer program product having computer-executable instructions stored thereon that, if executed by a computer based system, causes the computer based system to be capable of performing operations comprising:
acquiring, by the computer based system, a score from a mobile gaming app of a customer device associated with a customer;
determining, by the computer based system and based on the score, that the customer is a top gamer associated with a merchant at a merchant location;
identifying, by the computer based system, the customer with a top gamer identifier;
transmitting, by the computer based system, the top gamer identifier to the mobile gaming app on the customer device;
determining, by the computer based system, that the customer is on a list of customers of interest associated with the merchant at the merchant location;
determining, by the computer based system, a direct communication between a merchant device of the merchant and the customer device should be established, based on the customer being on the list of the customers of interest and the top gamer identifier; and
notifying, by the computer based system, the merchant device to establish the direct communication between the merchant device and the customer device,
wherein a discount is provided for display on the customer device while the customer device is in the merchant location, and
wherein the discount is only valid while the customer device continues to be within range of a BLE beacon at the merchant location.

* * * * *